US011250847B2

(12) United States Patent
Gelinske et al.

(10) Patent No.: US 11,250,847 B2
(45) Date of Patent: Feb. 15, 2022

(54) WIRELESS COMMUNICATIONS SYSTEM AND METHOD

(71) Applicant: Appareo Systems, LLC, Fargo, ND (US)

(72) Inventors: Joshua N. Gelinske, Fargo, ND (US); Bradley R. Thurow, Fargo, ND (US); Jesse S. Trana, Fargo, ND (US); Dakota M. Smith, Tuscon, AZ (US); Nicholas L. Butts, West Fargo, ND (US); Jeffrey L. Johnson, West Fargo, ND (US); Derek B. Aslakson, Fargo, ND (US); Jaden C. Young, Fargo, ND (US)

(73) Assignee: Appareo Systems, LLC, Fargo, ND (US)

(*) Notice: Subject to any disclaimer, the term of this patent is extended or adjusted under 35 U.S.C. 154(b) by 158 days.

(21) Appl. No.: 16/514,963

(22) Filed: Jul. 17, 2019

(65) Prior Publication Data
US 2020/0027457 A1 Jan. 23, 2020

Related U.S. Application Data

(60) Provisional application No. 62/699,044, filed on Jul. 17, 2018, provisional application No. 62/715,380, filed on Aug. 7, 2018.

(51) Int. Cl.
*G10L 15/22* (2006.01)
*H04B 7/185* (2006.01)
(Continued)

(52) U.S. Cl.
CPC .............. *G10L 15/22* (2013.01); *G06N 20/00* (2019.01); *G10L 15/063* (2013.01); *G10L 15/16* (2013.01);
(Continued)

(58) Field of Classification Search
CPC ...... G06N 20/00; G06K 9/6218; G10L 25/78; G10L 15/22; G10L 15/30; G10L 15/16;
(Continued)

(56) References Cited

U.S. PATENT DOCUMENTS 3,656,164 A 4/1972 Rempt
5,296,861 A 3/1994 Knight
(Continued)

FOREIGN PATENT DOCUMENTS

CN 106452549 2/2017

OTHER PUBLICATIONS

Google search list, Feb. 2021 (Year: 2021).*
(Continued)

*Primary Examiner* — Paras D Shah
*Assistant Examiner* — Darioush Agahi
(74) *Attorney, Agent, or Firm* — Hovey Williams LLP (57) ABSTRACT

A wireless communication system includes a smart device configured for transcribing text-to-speech (STT) for display. The smart device interfaces with a radio communications device, for example, in an aircraft (AC). The system includes a filter for optimizing STT functions. Such functions are further optimized by restricting the databases of information, including geographic locations, aircraft identifications and carrier information, whereby the database search functions are optimized. Methods for wireless communications using smart devices and STT functionality are disclosed.

21 Claims, 14 Drawing Sheets

(51) Int. Cl.
*G10L 15/06* (2013.01)
*G06N 20/00* (2019.01)
*G10L 25/78* (2013.01)
*G10L 15/183* (2013.01)
*G10L 15/30* (2013.01)
*G10L 15/16* (2006.01)

(52) U.S. Cl.
CPC .......... *G10L 15/183* (2013.01); *G10L 15/30* (2013.01); *G10L 25/78* (2013.01); *H04B 7/18506* (2013.01)

(58) Field of Classification Search
CPC .. G10L 15/063; G10L 15/183; H04B 7/18506
See application file for complete search history.

(56) References Cited

U.S. PATENT DOCUMENTS

| | | | |
|---|---|---|---|
| 5,400,031 | A | 3/1995 | Fitts |
| 5,689,266 | A | 11/1997 | Stelling |
| 6,222,480 | B1 | 4/2001 | Kuntman et al. |
| 6,422,518 | B1 | 7/2002 | Stuff |
| 7,068,233 | B2 | 6/2006 | Thronburg et al. |
| 8,102,301 | B2 | 1/2012 | Mosher |
| 8,155,612 | B1 | 4/2012 | Husted et al. |
| 9,886,862 | B1* | 2/2018 | Burgess .............. G08G 5/0026 |
| 9,893,413 | B2 | 2/2018 | Johnson et al. |
| 9,917,657 | B1* | 3/2018 | Reyes .................. H04B 17/391 |
| 10,027,662 | B1* | 7/2018 | Mutagi .................... G10L 15/22 |
| 10,102,760 | B1 | 10/2018 | Foltan et al. |
| 10,211,914 | B2 | 2/2019 | Stayton |
| 10,370,102 | B2 | 8/2019 | Boykin et al. |
| 10,532,823 | B1* | 1/2020 | Barber ................. G08G 5/0034 |
| 2003/0063004 | A1 | 4/2003 | Anthony |
| 2003/0233192 | A1 | 12/2003 | Bayh et al. |
| 2004/0224740 | A1 | 11/2004 | Ball et al. |
| 2005/0114627 | A1 | 5/2005 | Budny et al. |
| 2005/0156777 | A1 | 7/2005 | King et al. |
| 2005/0220055 | A1 | 10/2005 | Nelson et al. |
| 2005/0246353 | A1 | 11/2005 | Ezer et al. |
| 2006/0057974 | A1 | 3/2006 | Ziarno et al. |
| 2006/0176651 | A1 | 8/2006 | Olzak |
| 2006/0216674 | A1 | 9/2006 | Baranov et al. |
| 2006/0227995 | A1 | 10/2006 | Spatharis |
| 2007/0020588 | A1 | 1/2007 | Batcheller et al. |
| 2007/0100516 | A1 | 5/2007 | Olzak |
| 2007/0142980 | A1 | 6/2007 | Ausman et al. |
| 2007/0159378 | A1 | 7/2007 | Powers et al. |
| 2007/0241936 | A1 | 10/2007 | Arthur et al. |
| 2008/0254750 | A1 | 10/2008 | Whitaker Filho |
| 2008/0261638 | A1 | 10/2008 | Wahab et al. |
| 2009/0146875 | A1 | 6/2009 | Hovey |
| 2009/0147758 | A1 | 6/2009 | Kumar |
| 2009/0248287 | A1 | 10/2009 | Limbaugh et al. |
| 2010/0092926 | A1 | 4/2010 | Fabling |
| 2010/0149329 | A1 | 6/2010 | Maguire |
| 2010/0231706 | A1 | 9/2010 | Maguire |
| 2011/0125503 | A1 | 5/2011 | Dong et al. |
| 2011/0160941 | A1* | 6/2011 | Garrec .................. G01S 13/933 701/17 |
| 2011/0282521 | A1 | 11/2011 | Vlad |
| 2011/0282522 | A1* | 11/2011 | Prus ..................... G08G 5/0013 701/4 |
| 2011/0298648 | A1* | 12/2011 | Ferro .................... G08G 5/0078 342/29 |
| 2011/0298649 | A1 | 12/2011 | Robin et al. |
| 2012/0001788 | A1 | 1/2012 | Carlson et al. |
| 2012/0038501 | A1 | 2/2012 | Schulte et al. |
| 2012/0098714 | A1 | 4/2012 | Lin |
| 2012/0215505 | A1 | 8/2012 | Srivastev et al. |
| 2012/0265534 | A1* | 10/2012 | Coorman .............. G10L 13/033 704/265 |
| 2012/0299752 | A1 | 11/2012 | Mahmoud et al. |
| 2013/0093612 | A1 | 4/2013 | Pschierer et al. |
| 2013/0121219 | A1 | 5/2013 | Stayton |
| 2013/0137415 | A1 | 5/2013 | Takikawa |
| 2013/0171964 | A1 | 7/2013 | Bhatia et al. |
| 2013/0201037 | A1 | 8/2013 | Glover et al. |
| 2013/0265186 | A1 | 10/2013 | Gelli et al. |
| 2014/0024395 | A1 | 1/2014 | Johnson et al. |
| 2014/0081483 | A1 | 3/2014 | Weinmann et al. |
| 2014/0197981 | A1 | 7/2014 | Hartley et al. |
| 2014/0303813 | A1 | 10/2014 | Ihns |
| 2015/0083674 | A1 | 3/2015 | Sarno et al. |
| 2015/0162001 | A1 | 6/2015 | Kar et al. |
| 2015/0302870 | A1 | 10/2015 | Burke et al. |
| 2015/0341796 | A1 | 11/2015 | Williams et al. |
| 2015/0349875 | A1 | 12/2015 | Lauer et al. |
| 2015/0364044 | A1 | 12/2015 | Kashi et al. |
| 2016/0170025 | A1 | 6/2016 | Johnson et al. |
| 2016/0202950 | A1 | 7/2016 | Hawley |
| 2016/0301439 | A1 | 10/2016 | Brinkley |
| 2016/0347473 | A1 | 12/2016 | Khatwa et al. |
| 2016/0349361 | A1 | 12/2016 | Schulte |
| 2016/0363652 | A1 | 12/2016 | Hamminga et al. |
| 2016/0379640 | A1 | 12/2016 | Joshi et al. |
| 2017/0036776 | A1 | 2/2017 | He |
| 2017/0069312 | A1* | 3/2017 | Sundararajan .......... G10L 15/02 |
| 2017/0106997 | A1 | 4/2017 | Bekanich |
| 2017/0178624 | A1* | 6/2017 | Friedland ................ G10L 13/00 |
| 2017/0213552 | A1 | 7/2017 | Gupta |
| 2017/0299685 | A1 | 10/2017 | Mccullen et al. |
| 2017/0330465 | A1* | 11/2017 | Kim ..................... G08G 5/003 |
| 2018/0044034 | A1 | 2/2018 | Newman et al. |
| 2019/0147556 | A1* | 5/2019 | McCann ................ G06Q 50/26 340/8.1 |

OTHER PUBLICATIONS

"International Search Report and Written Opinion; PCT?US2019/042296; dated Oct. 11, 2019".

"International Search Report and Written Opinion; PCT/US18/46301/ dated Oct. 22, 2018".

* cited by examiner

WIRELESS COMMUNICATIONS SYSTEM AND METHOD

CROSS-REFERENCE TO RELATED APPLICATION

This application claims priority in U.S. Provisional Patent Application No. 62/699,044 Filed Jul. 17, 2018, and also claims priority is U.S. Provisional Patent Application No. 62/715,380 Filed Aug. 7, 2018 both of which are incorporated herein by reference.

BACKGROUND OF THE INVENTION

1. Field of the Invention

The present invention relates generally to the field of wireless communications, and in particular to an avionics communications system utilizing speech-to-text (STT) functionality with an onboard smart device.

2. Description of the Related Art

One of the most common communication practices in aviation and aircraft (AC) navigation is voice communication via radio frequency (RF) transmissions. Examples include communications amongst aircrew, Air Traffic Control (ATC), Automatic Terminal Information Services (ATIS), etc. Aircrew are frequently tasked with managing AC piloting and navigation while listening and responding verbally to ATC and ATIS communications. Various systems and methods have previously been proposed for managing and optimizing communications in aviation operations. However, heretofore there is not been available a system and method with the advantages and features of the present invention.

BRIEF SUMMARY OF THE INVENTION

In the practice of the present invention, a wireless communication system includes an RF communications radio configured for transmitting and receiving analog or digital voice communications. Without limitation on the generality of useful applications of the present invention, an onboard AC application is disclosed. An onboard smart device can be configured for personal use by an aircrew member or members. The smart device interfaces with the communications radio via a hardwired or wireless connection. The smart device includes a speech-to-text (STT) program configured for transcribing analog or digital communications and displaying them in textual format to an aircrew member. The system further includes localizing functions for optimizing operation via GNSS-defined AC locations, and a signal filter adapted to optimize speech recognition functions in environments such as AC cockpits and cabins.

BRIEF DESCRIPTION OF THE DRAWINGS

The drawings constitute a part of this specification and include exemplary embodiments of the present invention illustrating various objects and features thereof.

DETAILED DESCRIPTION OF THE PREFERRED EMBODIMENTS

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

I. Introduction and Environment

Referring to the drawings more detail, the reference numeral 10 generally designates a wireless communications system embodying an aspect of the present invention. Without limitation on the generality of useful applications of the system 10, an exemplary application is in an AC for facilitating aviation operations. The AC includes a cockpit panel 12 mounting flight controls (e.g., yoke 14) and instrumentation 16, including a radio communications device 18 connected to a headset 20 enabling an aircrew member (e.g., pilot) to effectively engage in RF communications.

Figure 1:
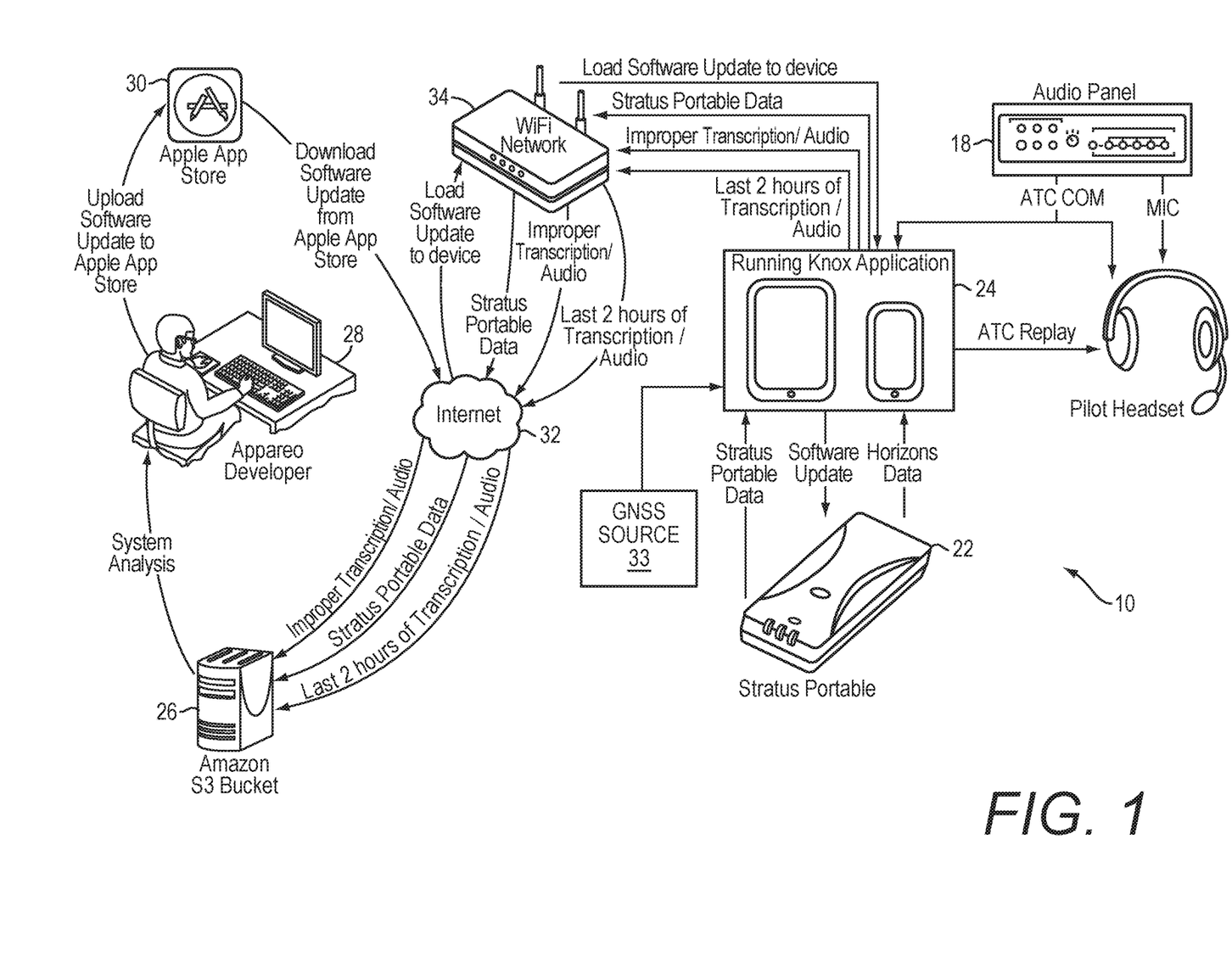
FIG. 1 shows the architecture of a communication system embodying an aspect or embodiment of the present invention.

As shown in FIG. 1, onboard components of the system 10 include the radio communications device 18 (shown in a radio/audio panel), the pilot headset 20, an ADS-B device 22 (e.g., a Stratus device available from Appareo Systems, LLC of Fargo, N. Dak. (U.S. Pat. No. 9,172,481 for Automatic Multi-Generational Data Caching and Recovery, which is incorporated herein by reference)) and a microprocessor-based smart device 24.

Elements of the system remote from the AC (e.g. ground-based or on another AC) include a server 26, a quality assurance operator 28, a software application source (e.g. Apple App store) 30. The server 26 connects via the cloud (Internet) 32 to a Wi-Fi network 34 for connection to the onboard microprocessor 24. A global navigation satellite system (GNSS) source 33 provides positioning signals to the system 10. FIG. 1 shows communications paths for analog and digital communications among the system 10 components.

Figure 2:
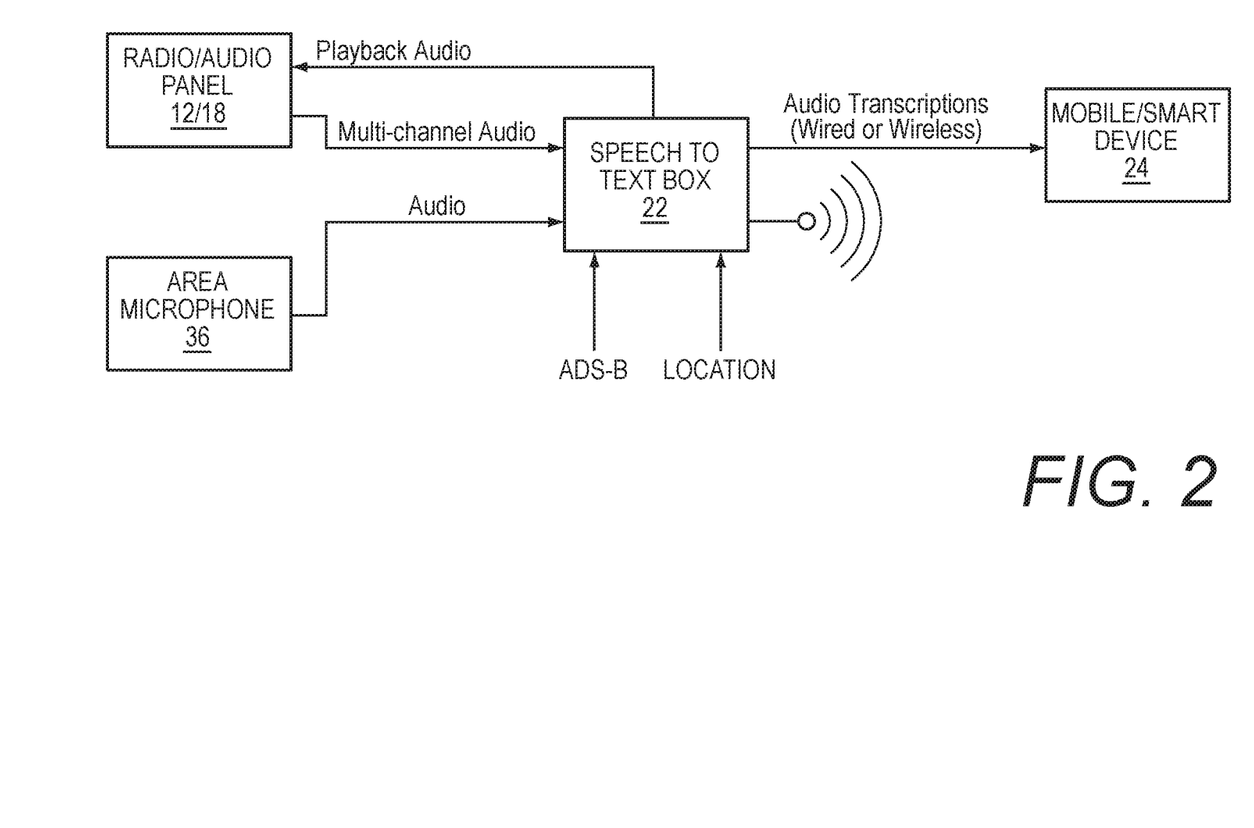
FIG. 2 is a fragmentary, schematic diagram thereof, particularly showing a multi-channel system.

FIG. 2 shows a multi-channel or multi-frequency embodiment of the present invention. A single-channel (frequency) embodiment is feasible, but RF communications systems commonly utilize multiple channels for accommodating different types of communications (e.g., AC-AC, AC-ATC, emergency, weather, etc.). The radio/audio panel component 12/18 accommodates the radio communications device 18 and other cockpit panel 12 components. The STT box, as described above, can be coupled with the microprocessor device 22. Audio input from the AC to the STT can also be provided via an area microphone 36. FIG. 2 also shows the wired and/or wireless interfaces between the STT box 22 and the mobile/smart device 24.

Figure 3:
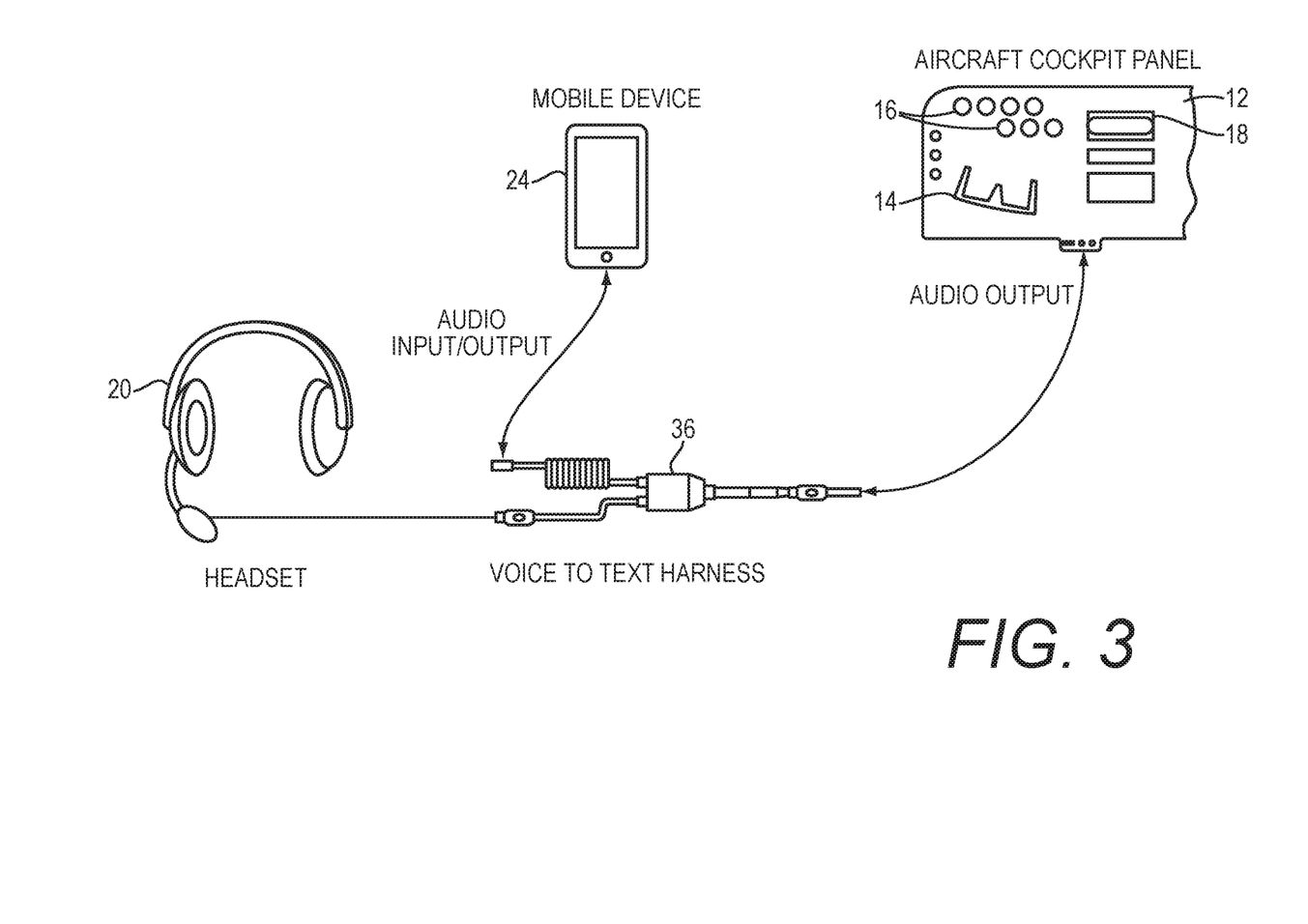
FIG. 3 is a fragmentary diagram of the system, particularly showing an aircrew headset, a smart (mobile) device and part of an AC cockpit panel, hardwired together via a Y-splitter.
Figure 4:
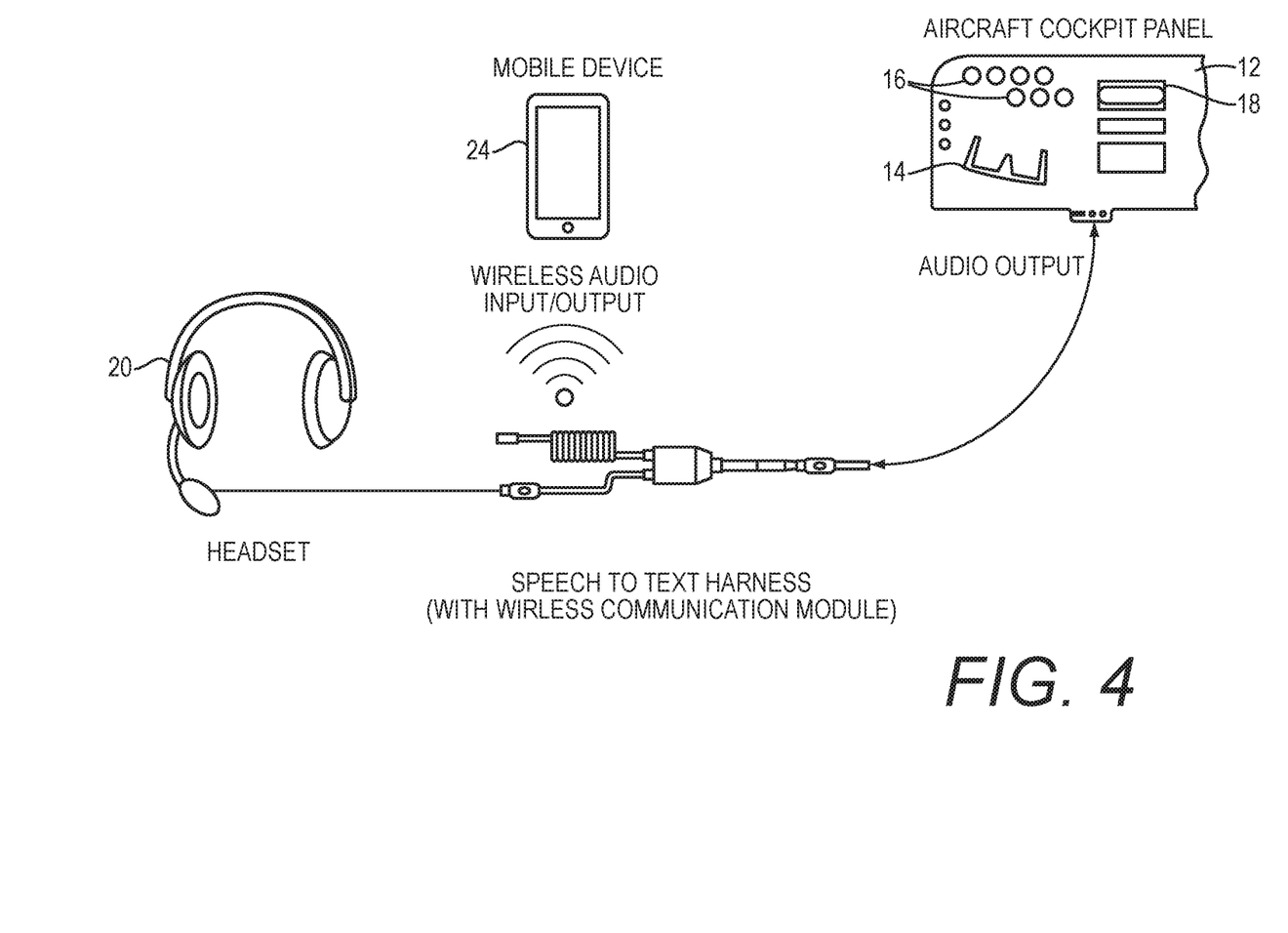
FIG. 4 is a fragmentary diagram of the system, particularly showing a wireless interface between the smart device, an aircrew headset and the AC cockpit panel.

FIG. 3 shows the hardwired embodiment of the invention with the headset 20, the smart/mobile device 24 and the radio communications device 18 interconnected via a Y connector 36, which functions as a STT harness. Suitable plug-type, multi-conductor connectors can be utilized for efficiently assembling and disassembling the system 10 components. For example, aircrew often have their own headsets and smart devices, which can thus be transferred among multiple AC. FIG. 4 also shows these components, with a wireless audio input/output configuration with the smart/mobile device 24.

Figure 5:
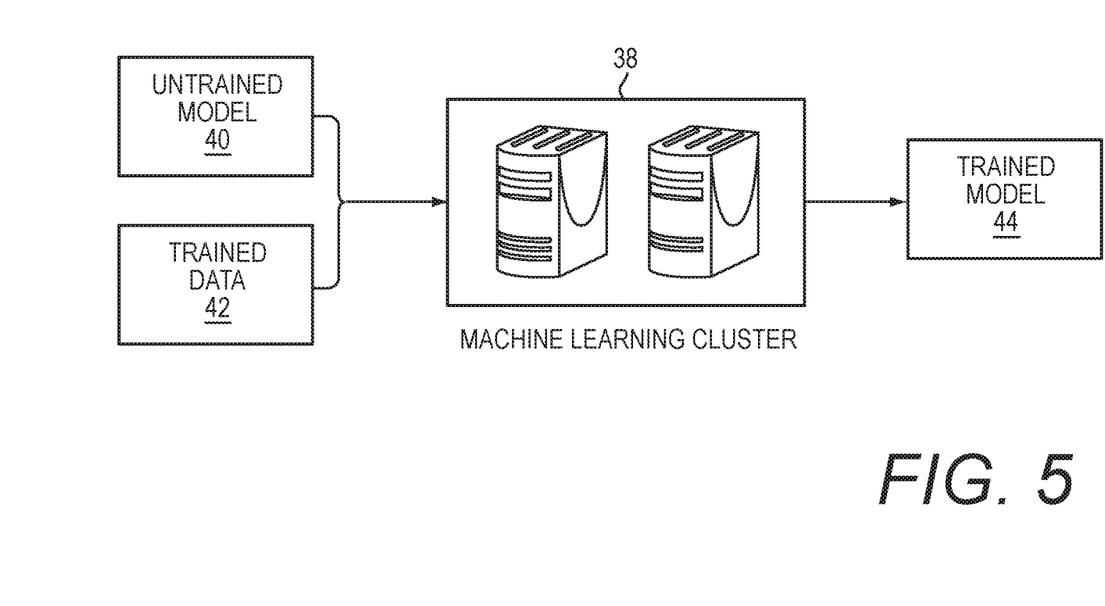
FIG. 5 is a fragmentary diagram of the system, particularly showing a training system with a machine learning cluster.

FIG. 5 shows a training system for the system 10 including a machine learning cluster 38 receiving inputs from an untrained model 40 and training data 42. The machine learning cluster 38 provides a trained 44 model as output.

Figure 6:
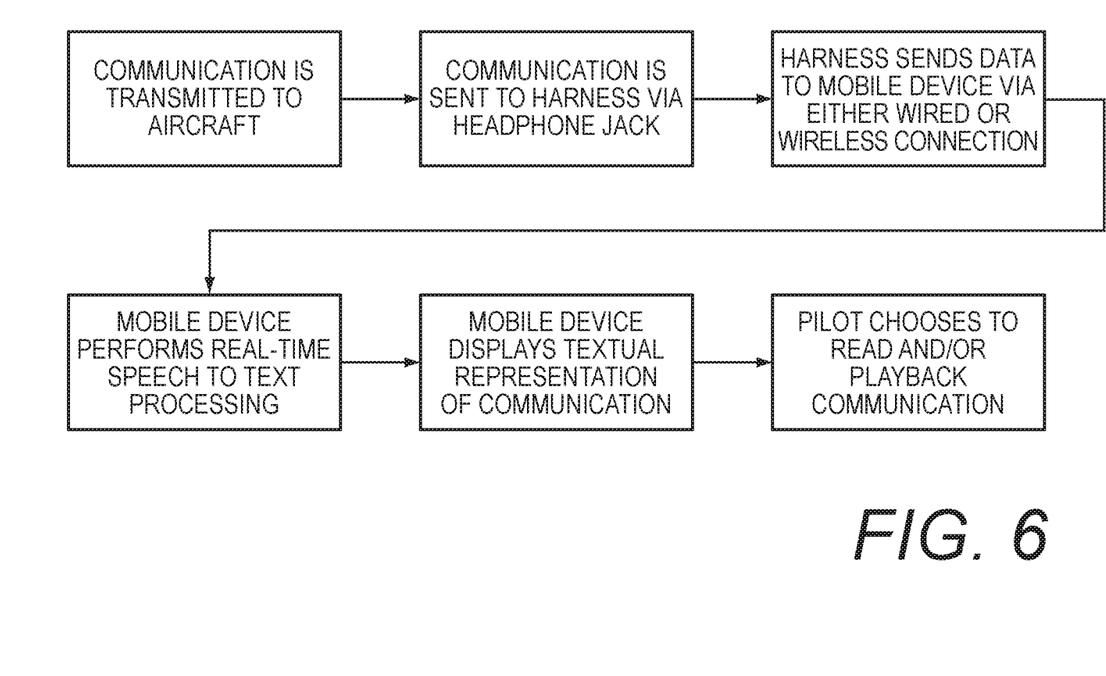
FIG. 6 is a high level STT processing flowchart.
Figure 7:
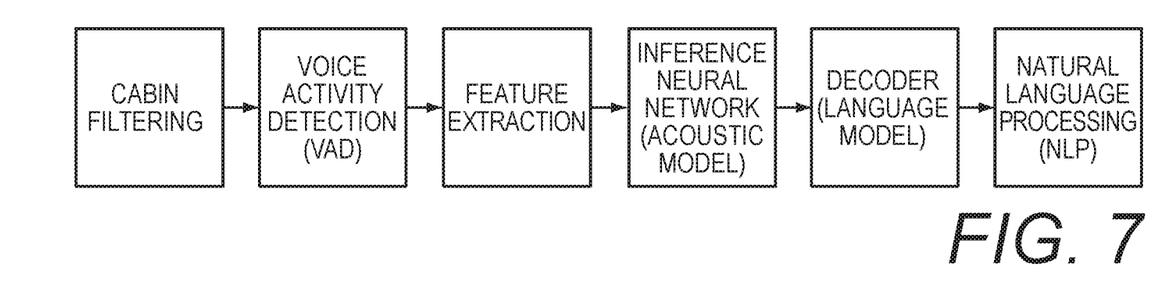
FIGS. 7-9 show alternative embodiment STT flowcharts.
Figure 8:
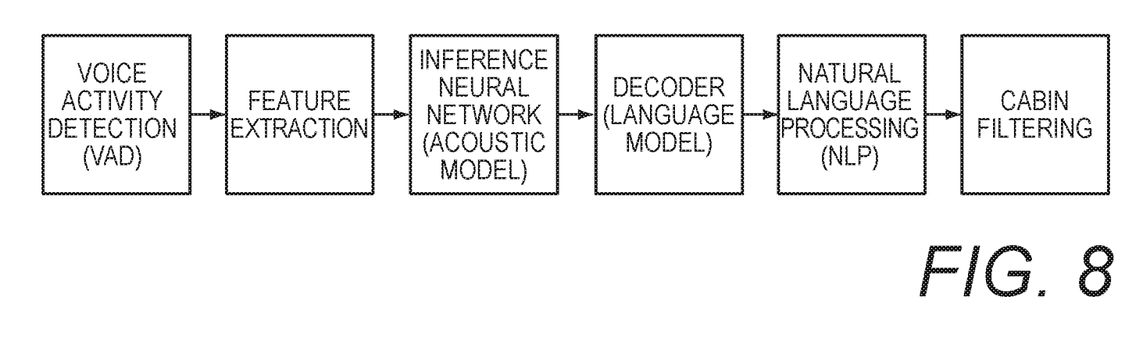
Figure 9:
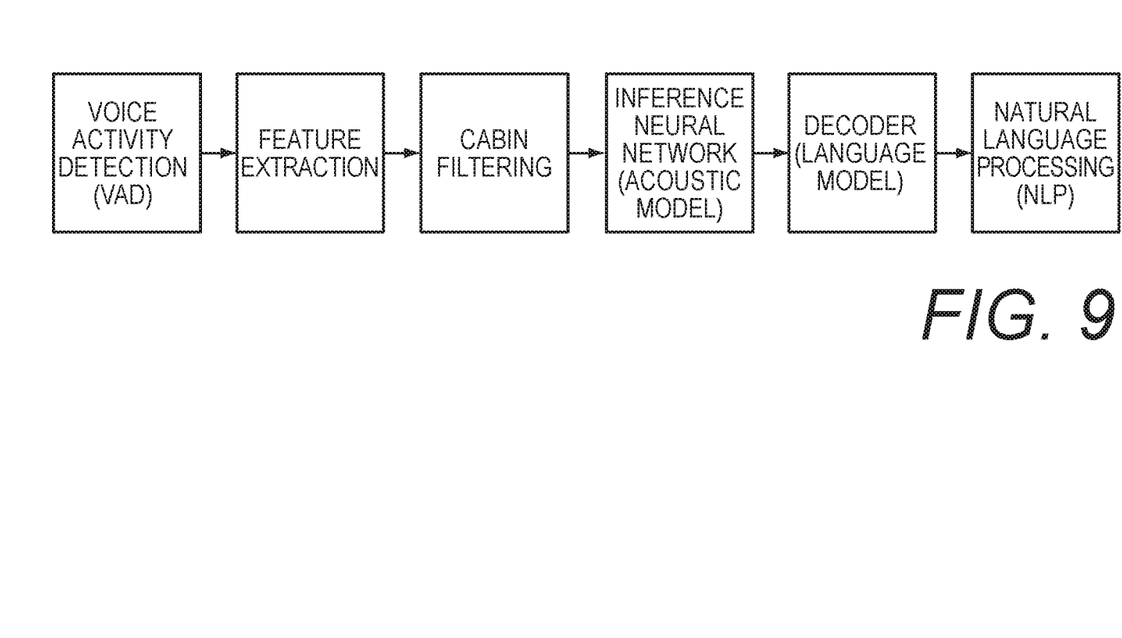

FIG. 6 shows a flowchart for the STT processing function of the system 10. FIGS. 7-9 show flowcharts for alternative STT processing procedures. Such alternative procedures can be chosen for effectiveness in particular applications. For example, AC applications may benefit from cabin noise filtering. Moreover, STT can be optimized by accounting for regional dialects among speakers, multi-lingual STT software, localization and context-based speech recognition models.

Figure 10:
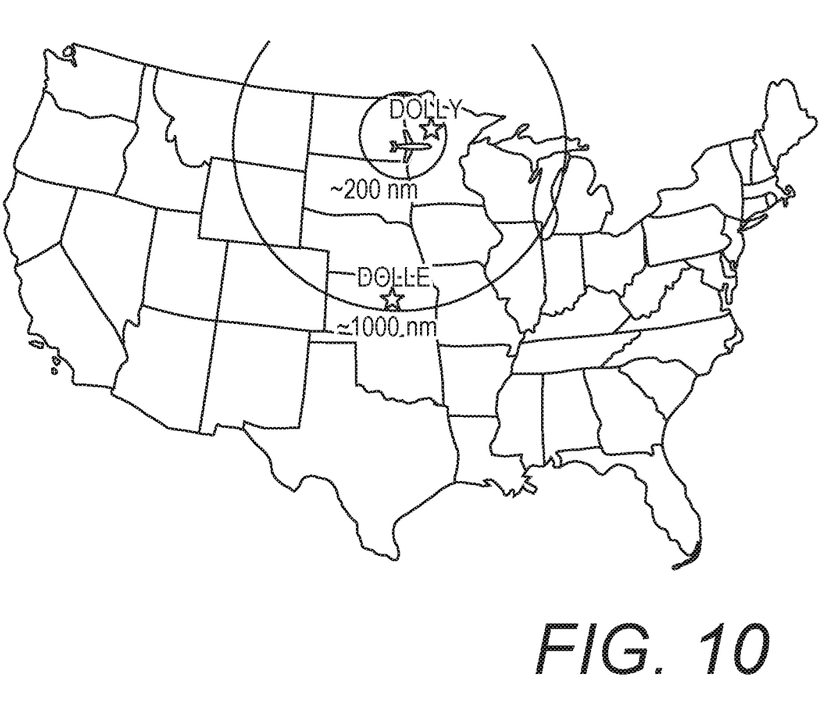
FIG. 10 is a map showing an application of the localization function.
Figure 11:
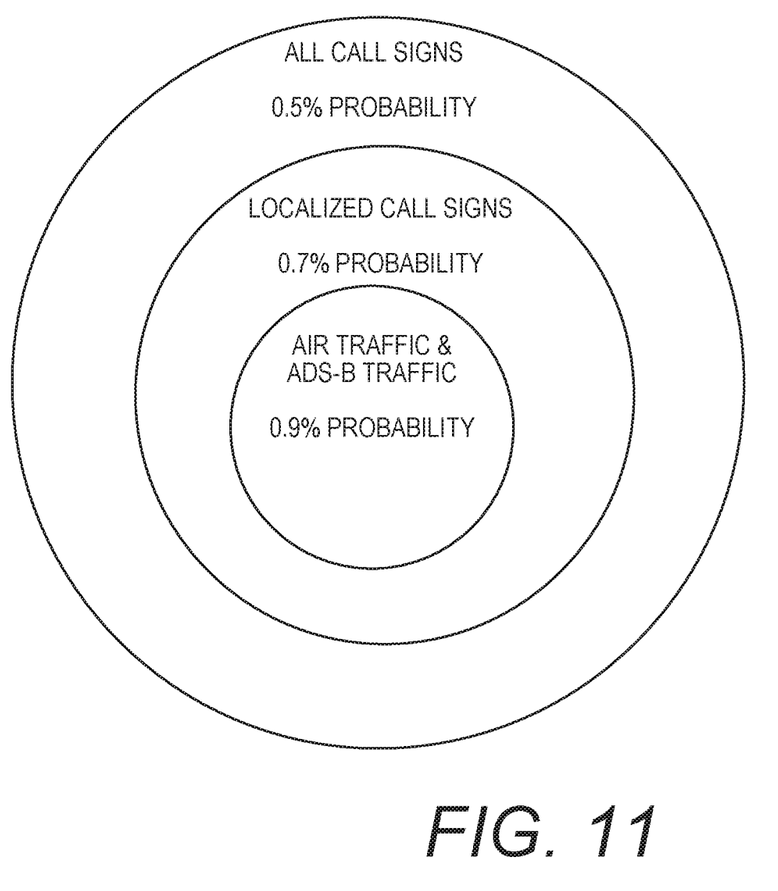
FIG. 11 is a Venn diagram showing call sign recognition probability.

FIG. 10 shows a database localization function based on GNSS-defined locations of the AC. For example, on a cross-country flight, communications with ATC's, other AC, etc. are of greater interest in proximity to the AC's flight crew. Waypoints and fixtures are commonly identified with 4-5 characters for decoding. Thus, the current location of the AC can define a circular geographic area of interest with a predetermined radius (e.g., 250 nm). Such filtering and localization can also be accomplished by utilizing names of carriers, e.g., "FedEx" for a database subset corresponding to locations (airports, addresses, other businesses, etc.) serviced by the Federal Express Corporation. Still further, the database can utilize the tail number registrations assigned by the Federal Aviation Administration (FAA) for callsign localization. The system of the present invention utilizes these and other database functions for maximizing the probabilities of accurate identifications. Such probabilities can be modeled and effectively utilized by software located onboard or remotely for access via the cloud 32. FIG. 11 shows a hierarchy with hypothetical probabilities based on databases including: all call signs; localized call signs; and air and ADS-B traffic call signs. Other signals can be filtered and excluded. The operating efficiency of the system 10 can thus be optimized by focusing consideration of communications locally on a relatively small subset of communications nationwide or globally.

Figure 12:
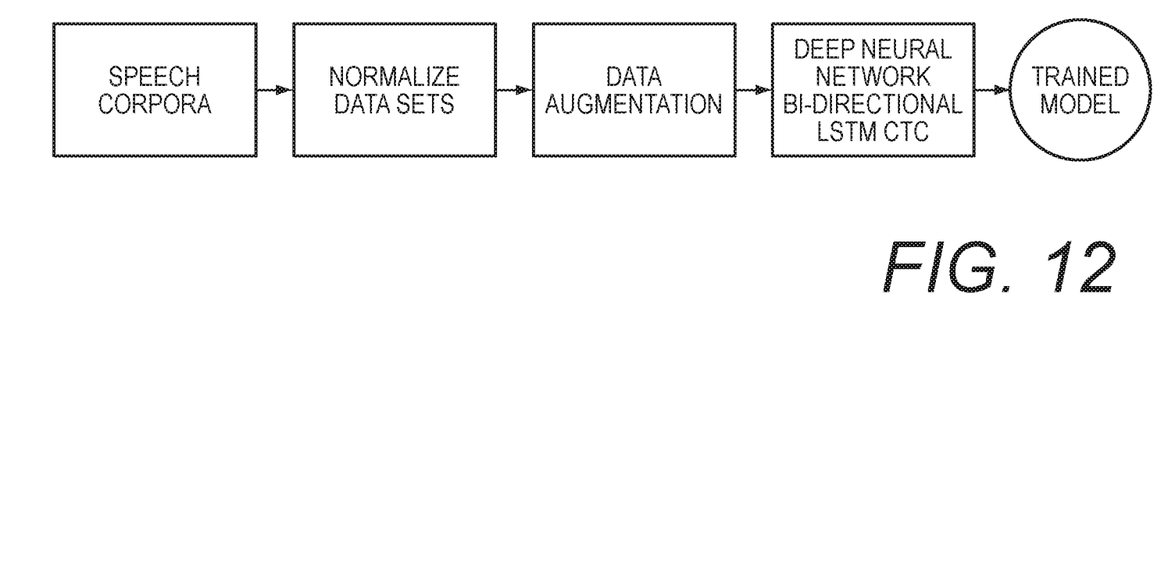
FIG. 12 is a flowchart showing the high-level architecture of a training system.

FIG. 12 shows a flowchart for implementing the present invention using speech corpora, which can be selected among multiple options, normalizing data sets, data augmentation, deep neural network bi-directional long short-term memory (LSTM) and Correctionist Temporal Classification (CTC), resulting in a trained language model output.

Figure 13:
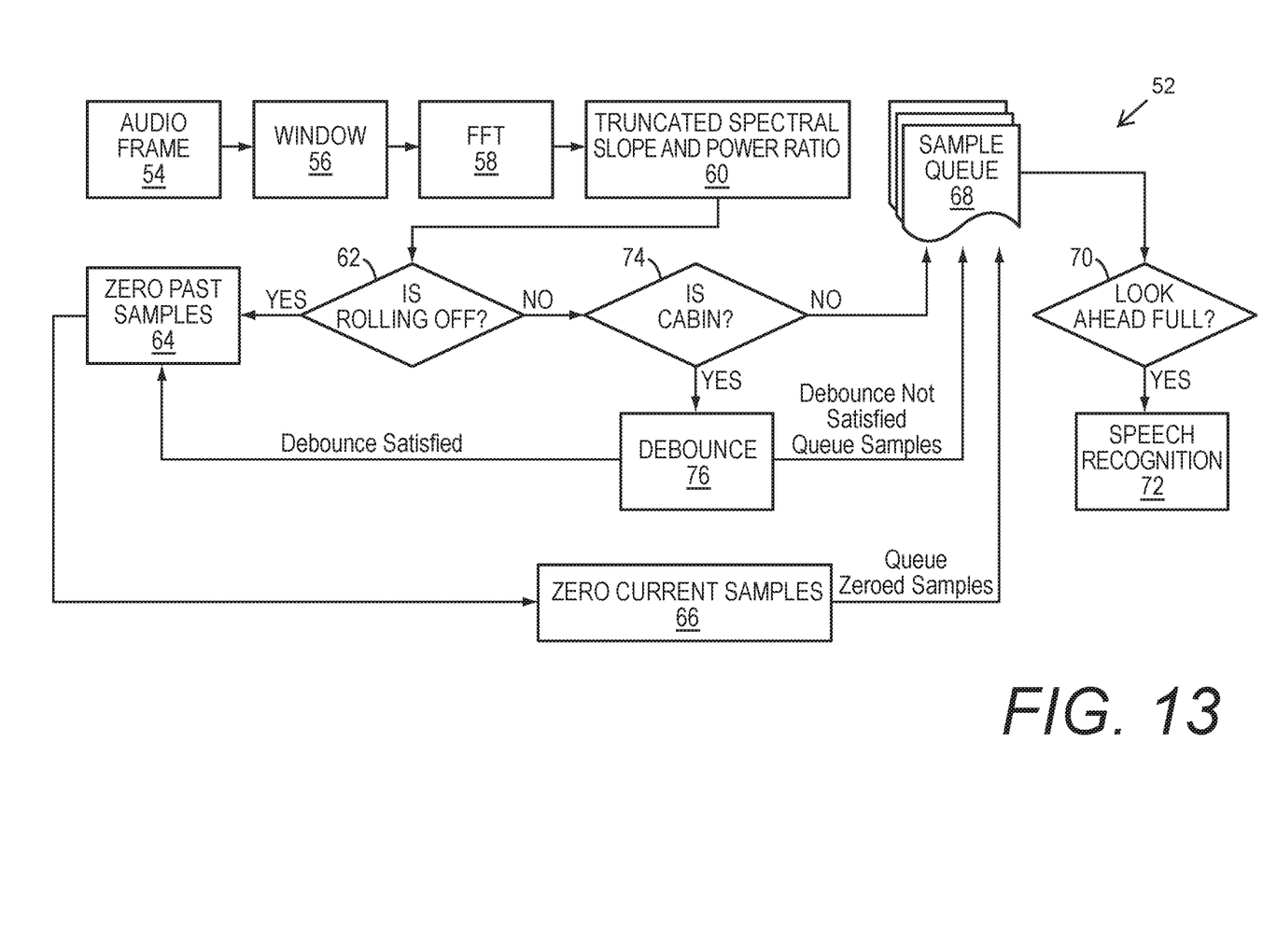
FIG. 13 is a schematic diagram of an audio processing filter subsystem.

FIG. 13 shows a filter subsystem flowchart 52 configured for use with the present invention. Signals progress from an audio frame 54 to a window 56 and then to a fast Fourier transform (FFT) 58. From a truncated spectral slope and power ratio step 60 the method proceeds to a decision box 62 whereat the signal is analyzed for a rolling off characteristic. If "YES," the method proceeds to a Zero Past Samples step 64 and then proceeds to a Zero Current Samples step 66. Through a queue zeroed samples process the method proceeds to a Sample Queue at 68, then to a Look Ahead Full decision box 70. If "YES," speech recognition results at 72. If the signal being filtered is not rolling off, the method proceeds to a "Is Cabin" decision box: if no, the method proceeds to the sample queue step 68; if yes, the method proceeds to a debounce step 76, satisfying the debounce and proceeding to the zero past samples step 64.

Figure 14:
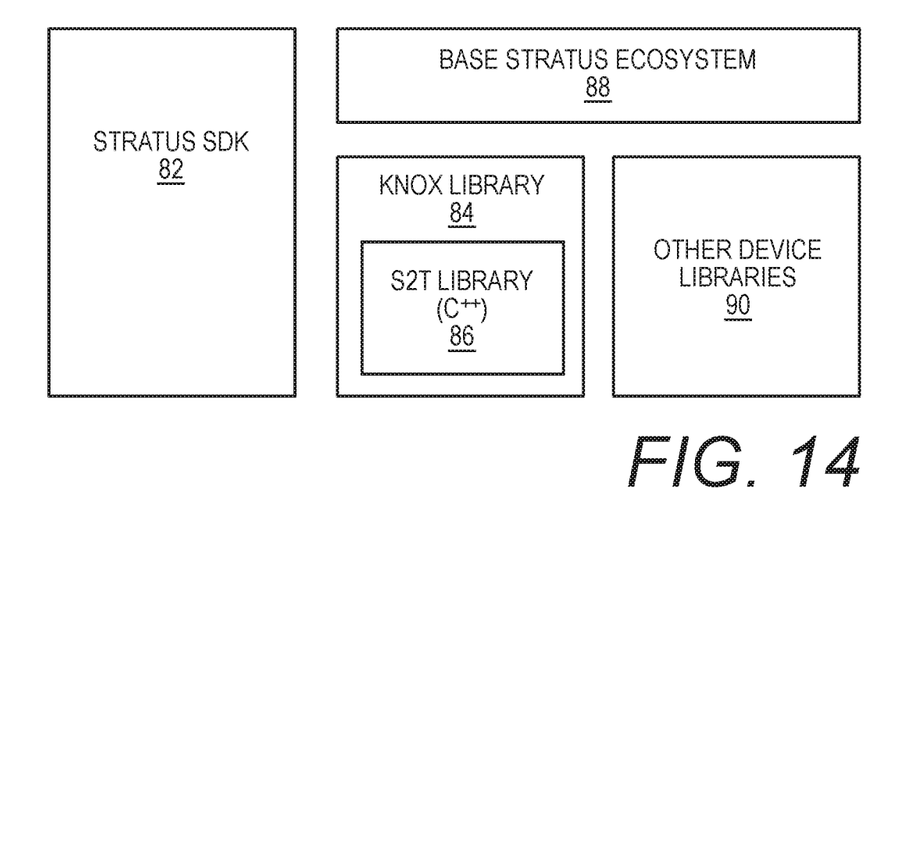
FIG. 14 is a block diagram of the system in conjunction with an ADS-B component.
Figure 15:
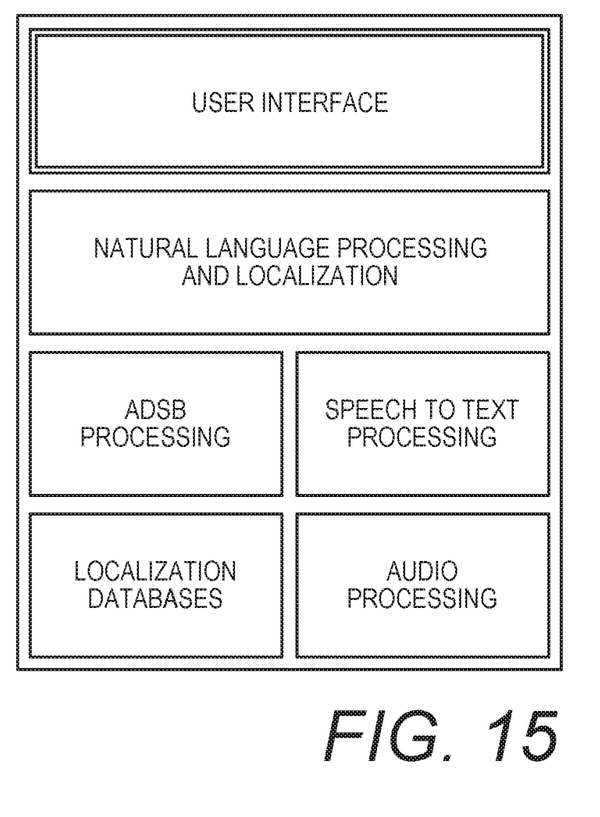
FIG. 15 is a block diagram of a user interface of the system.

FIG. 14 is a block diagram showing a Stratus software development kit (SDK) 74, a Knox (wireless communications system) library 84 including an STT library (e.g., C++ programming language) 86, a base Stratus ecosystem 88. Other device libraries 90 can provide additional data. FIG. 15 is a block diagram of a user interface of the system.

Having this described the invention, what is claimed as new and desired to be secured by Letters Patent is:

1. A speech-to-text (STT) avionics transcription system for transcribing radio frequency (RF) communications transmitted from and received on board an aircraft (AC), the system comprising:

a smart device configured for receiving said RF communications;

said smart device including a display visible to aircrew; and an STT program installed and running on said smart device, said STT program configured for converting said RF communications to digital text for display on said smart device, said STT program including a localization function configured for optimizing communications by maximizing probabilities of accurate identifications in converting said RF communications to digital text based on AC proximity to respective geographic locations along AC flight paths, the localization function including a call sign hierarchy function assigning probabilities to call signs in sets of I) all call signs, II) localized call signs, and III) air traffic and ADS-B traffic call signs, wherein the localized call signs set is a subset of the all call signs set, and localized call signs in the localized call signs subset have higher probabilities than call signs not included in the localized call signs subset, and wherein the air traffic and ADS-B traffic call signs set is a subset of the localized call signs subset, and air traffic and ADS-B traffic call signs in the air traffic and ADS-B traffic call signs subset have higher probabilities than call signs not included in the air traffic and ADS-B traffic call signs subset.

2. The STT avionics transcription system according to claim 1, which includes:
a radio communications device onboard said AC and configured for transmitting and receiving said RF communications;
said radio communications device configured for selective connection to said smart device; and
an audio subsystem onboard said AC, connected to said radio communications device and configured for output of said communications to aircrew.

3. The STT avionics transcription system according to claim 2, which includes:
said radio communications device and said smart device being interconnected via one of a hardwired or wireless connection; and
a Y-connector including a first connection to said radio communications device, a second connection to said audio subsystem and a third connection to said smart device.

4. The STT avionics transcription system according to claim 3, which includes:
said radio communications device comprising a multiple-channel communications radio; and said multiple-channel communications radio is configured for monitoring:
a primary communications channel for communicating with air traffic control (ATC) and other AC; and
a secondary channel for weather and emergency communications.

5. The STT avionics transcription system according to claim 2, which includes an automatic dependent surveillance-broadcast (ADS-B) device onboard said AC and connected to said radio communications device.

6. The STT avionics transcription system according to claim 3, which includes a machine learning cluster configured for training said STT program, said machine learning cluster configured for receiving untrained model and training data input and providing trained model output.

7. The STT avionics transcription system according to claim 3, wherein said aircrew can access said communications audibly and/or visually.

8. The STT avionics transcription system according to claim 3, wherein said STT avionics transcription system includes: cabin filtering, voice activity detection (VAD), feature extraction, an inference-neural network (acoustic model), decoder language model and natural language processing.

9. The STT avionics transcription system according to claim 3, wherein said STT avionics transcription system includes:
an inference-neural network (acoustic model) configured to receive acoustic model inference processing input; and
a decoder (language model) configured to receive language model decoding input.

10. The avionics system according to claim 3, which includes:
a Global Navigation Satellite System (GNSS) onboard said AC and configured for generating a GNSS-defined AC location of said AC; and
and a database localization feature utilizing said GNSS-defined AC location.

11. The speech-to-text avionics system according to claim 1, which includes:

a database server located remotely from said aircraft and configured for interfacing with said smart device via a cloud network.

12. The STT avionics transcription system according to claim 4, wherein said multiple-channel communications radio is configured for multi-frequency transmitting and receiving.

13. The STT avionics transcription system according to claim 4, wherein said multiple-channel communications radio includes a primary frequency and multiple secondary frequencies, said multiple-channel communications radio configured for receiving and transmitting on said primary frequency and said multiple secondary frequencies.

14. The STT avionics transcription system according to claim 1, which includes:
a global navigation satellite system (GNSS) subsystem configured for locating an aircraft with said avionics system on board; and
said STT avionics transcription system configured for optimizing performance by localizing said aircraft with said GNSS-defined position data.

15. A speech-to-text (STT) avionics transcription system for transcribing radio frequency (RF) communications transmitted from and received on board an aircraft (AC), which system includes:
a smart device configured for receiving said communications;
said smart device including a display visible to aircrew;
a STT program installed and running on said smart device, said STT program configured for converting said communications to digital text for display on said smart device,
said STT program including a localization function configured for optimizing communications by maximizing probabilities of accurate identifications in converting said RF communications to digital text based on AC proximity to respective geographic locations along AC flight paths,
said localization function includes a call sign hierarchy function assigning probabilities to call signs in sets of I) all call signs, II) localized call signs, and III) air traffic and ADS-B traffic call signs,
wherein the localized call signs set is a subset of the all call signs set, and localized call signs in the localized call signs subset have higher probabilities than call signs not included in the localized call signs subset, and
wherein the air traffic and ADS-B traffic call signs set is a subset of the localized call signs subset, and air traffic and ADS-B traffic call signs in the air traffic and ADS-B traffic call signs subset have higher probabilities than call signs not included in the air traffic and ADS-B traffic call signs subset,
said STT program being configured to account for regional speaker dialects, multiple languages, and speech context;
a radio communications device onboard said AC and configured for transmitting and receiving said RF communications;
said radio communications device configured for selective connection to said smart device;
an audio subsystem onboard said AC, connected to said radio communications device and configured for output of said communications to aircrew;
said radio communications device and said smart device being interconnected via one of a hardwired or wireless connection;

a Y-connector including a first connection to said radio communications device, a second connection to said AC audio subsystem and a third connection to said smart device;

said radio communications device comprising a multiple-channel communications radio; and said multiple-channel communications radio is configured for monitoring: a primary communications channel for communicating with air traffic control (ATC) and other AC; and a secondary channel for weather and emergency communications;

an automatic dependent surveillance-broadcast (ADS-B) device onboard said AC and connected to said radio communications device;

a machine learning cluster configured for training said STT program, said machine learning cluster configured for receiving untrained model and training data input and providing trained model output;

said STT avionics transcription system including: cabin filtering, voice activity detection (VAD), feature extraction, inference-neural network (acoustic model), decoder language model and natural language processing;

said STT avionics transcription system including: the inference-neural network (acoustic model) receiving acoustic model inference processing input; and a decoder (language model) receiving language model decoding input;

a Global Navigation Satellite System (GNSS) onboard said AC and configured for generating a GNSS-defined AC location of said AC; and a database localization feature utilizing said GNSS-defined AC location.

16. A wireless communications method including the steps of:

providing a smart device configured for receiving communications;

providing said smart device with a display visible to aircrew; and installing on said smart device an STT program and running on said smart device, said STT program configured for converting said communications to digital text for display on said smart device, said STT program including a localization function configured for optimizing communications by maximizing probabilities of accurate identifications in converting said RF communications to digital text based on AC proximity to respective geographic locations along AC flight paths, the localization function including a call sign hierarchy function assigning probabilities to call signs in sets of I) all call signs, II) localized call signs, and III) air traffic and ADS-B traffic call signs, wherein the localized call signs set is a subset of the all call signs set, and localized call signs in the localized call signs subset have higher probabilities than call signs not included in the localized call signs subset, and wherein the air traffic and ADS-B traffic call signs set is a subset of the localized call signs subset, and air traffic and ADS-B traffic call signs in the air traffic and ADS-B traffic call signs subset have higher probabilities than call signs not included in the air traffic and ADS-B traffic call signs subset.

17. The wireless communication method according to claim 16, which includes the additional steps of:

providing a radio communications device selectively connected to said smart device; and optimizing performance of said wireless communications method using one or more of aircraft identification in an avionics application and global navigation satellite system (GNSS) positioning information.

18. The wireless communication method according to claim 16, which includes the additional filtering steps of:

providing an audio frame for receiving audio signals;

defining a signal window;

applying a fast Fourier transform (FFT) to said audio signals; and applying a truncated spectral slope and power ratio filter to said audio signals.

19. The speech-to-text (STT) avionics transcription system according to claim 1, wherein the localization function is a database localization function based on a current location of the aircraft defining a circular geographical area of interest with a predetermined radius.

20. The speech-to-text (STT) avionics transcription system according to claim 15, wherein the localization function is a database localization function based on a current location of the aircraft defining a circular geographical area of interest with a predetermined radius.

21. The wireless communication method according to claim 16, wherein the localization function is a database localization function based on a current location of the aircraft defining a circular geographical area of interest with a predetermined radius.

* * * * *